United States Patent
Inoue et al.

(10) Patent No.: US 7,657,361 B2
(45) Date of Patent: Feb. 2, 2010

(54) FUEL INJECTION CONTROL DEVICE FOR DIESEL ENGINE

(75) Inventors: Mikio Inoue, Susono (JP); Yasuyuki Terada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 117 days.

(21) Appl. No.: 12/065,554

(22) PCT Filed: Sep. 1, 2006

(86) PCT No.: PCT/JP2006/317365
§ 371 (c)(1),
(2), (4) Date: Mar. 28, 2008

(87) PCT Pub. No.: WO2007/026887
PCT Pub. Date: Mar. 8, 2007

(65) Prior Publication Data
US 2009/0254261 A1  Oct. 8, 2009

(30) Foreign Application Priority Data
Sep. 2, 2005  (JP)  ............... 2005-255261

(51) Int. Cl.
*B60T 7/12* (2006.01)
*F02M 7/00* (2006.01)
(52) U.S. Cl. .................. 701/104; 123/436; 123/674; 123/687
(58) Field of Classification Search .................. 701/103, 701/104, 105, 115; 123/434, 436, 674, 675, 123/681, 687
See application file for complete search history.

(56) References Cited

U.S. PATENT DOCUMENTS

| | | | | | |
|---|---|---|---|---|---|
| 5,896,839 | A | * | 4/1999 | Togai | 123/295 |
| 5,970,947 | A | * | 10/1999 | Iida et al. | 123/295 |
| 5,979,413 | A | * | 11/1999 | Ohnuma et al. | 123/491 |
| 6,425,366 | B1 | * | 7/2002 | Ogawa et al. | 123/295 |

(Continued)

FOREIGN PATENT DOCUMENTS

JP    2002 235590    8/2002

(Continued)

*Primary Examiner*—John T Kwon
(74) *Attorney, Agent, or Firm*—Oblon, Spivak, McClelland, Maier & Neustadt, L.L.P.

(57) ABSTRACT

An electronic control unit 30 of a diesel engine 10 stores a relationship between a required fuel injection amount and a corresponding injection command signal. The unit 30 generates the injection command signal corresponding to the required fuel injection amount based on the stored relationship, and drives injectors 20 based on the injection command signal to inject fuel. The unit 30 includes a shifting section, which forcibly changes the engine rotational speed by temporarily shifting the fuel injection mode between a first injection mode and a second injection mode. The first injection mode is a mode in which an after injection is executed after a main injection. The after injection has less fuel injection amount than the main injection. The second injection mode is a mode in which the after injection is not executed. The unit 30 includes a correction section, which detects the variation of the engine rotational speed caused by shifting the fuel injection mode, and corrects the relationship based on comparison between the detected variation of the engine rotational speed and a previously determined standard variation of the engine rotational speed.

20 Claims, 5 Drawing Sheets

U.S. PATENT DOCUMENTS

| | | | |
|---|---|---|---|
| 6,497,212 B2 * | 12/2002 | Matsumoto et al. | 123/295 |
| 6,631,704 B2 * | 10/2003 | Ogawa et al. | 123/295 |
| 6,751,544 B2 * | 6/2004 | Hashimoto et al. | 701/107 |
| 2002/0059919 A1 * | 5/2002 | Ogawa et al. | 123/478 |
| 2005/0071073 A1 * | 3/2005 | Ueda et al. | 701/101 |

FOREIGN PATENT DOCUMENTS

| | | |
|---|---|---|
| JP | 2002 266678 | 9/2002 |
| JP | 2003 27995 | 1/2003 |
| JP | 2003 56389 | 2/2003 |
| JP | 2004 19637 | 1/2004 |
| JP | 2004 293486 | 10/2004 |

* cited by examiner

FUEL INJECTION CONTROL DEVICE FOR DIESEL ENGINE

FIELD OF THE INVENTION

The present invention relates to a fuel injection control device for diesel engine that generates an injection command signal corresponding to a required fuel injection amount based on the relationship between the required fuel injection amount and the injection command signal, and drives injectors based on the injection command signal to inject fuel.

BACKGROUND OF THE INVENTION

In diesel engines, to reduce combustion noise and clean up exhaust property, a pilot injection, in which a small amount of fuel is injected prior to a main injection, and an after injection, in which a small amount of fuel is injected again after the main injection, are performed. In such pilot injection and after injection, minute fuel injection amounts need to be precisely adjusted. However, since the fuel injection property of injectors varies due to the initial individual difference, changes over time, or the state of injection holes that varies moment to moment, slight divergence is inevitable between the required fuel injection amount set in accordance with the engine operating state and the amount of fuel actually injected from the injectors. In particular, when controlling the minute fuel injection amount such as the pilot injection and the after injection, although such divergence between the required fuel injection amount and the actual fuel injection amount is small, its influence cannot be ignored.

In the conventional art, for example, a fuel injection control device as disclosed in Patent Document 1 has been proposed. The device executes multiple injection in which fuel is equally divided and injected so as to correct the fuel injection property of injectors, in particular, the fuel injection property when a minute amount of fuel is injected.

In this device, when a predetermined learning condition is satisfied during idle operation of the engine, first, the fuel injection mode is shifted to the multiple injection. The fuel injection amount is then adjusted to eliminate the fluctuation of the engine rotational speed and the fluctuation among cylinders so that the engine operating state is stabilized. Since the total minimum fuel injection amount required to execute stable engine idle operation is almost uniquely determined in accordance with, for example, the specification of the engine, when the total minimum fuel injection amount is represented by "Q", for example, the fuel injection amount in the multiple injection is expressed by "Q/n (n: number of divisions)". When the injection command signal of an injector in a state where the engine operating state is stabilized is "T", that is, when the time during which the injector is supplied with power in each injection of the multiple injection is "T", the time during which the injector is supplied with power appropriate for injecting fuel the amount of which is "Q/n" is "T". Thus, the time T is learned as the injection command signal corresponding to the fuel injection amount Q/n. Since such learning is carried out, even if the fuel injection property of the injector deviates from the standard fuel injection property due to the initial individual difference and changes over time, the injection command signal of the injector is corrected in accordance with the actual fuel injection property.

However, the following is concerned in the conventional learning process associated with the minute fuel injection amount.

In this learning process, the fuel injection amount when the engine idle operating state is stable needs to be constant regardless of the fuel injection mode.

That is, the fuel injection amount required to obtain stable engine idle operating state needs to be basically the same in both the case where fuel is injected all together, and the case where fuel is equally divided and injected multiple times.

However, in practice, the fuel injection amount required to obtain stable engine idle operating state varies depending on the fuel injection mode between the case where batch injection is executed and the case where multiple injection is executed. This is because of various factors such as that the fuel injection amount of each phase fluctuates by the fuel pressure pulsation caused by executing the multiple injection, or that the generation pattern of the engine output is inevitably changed due to difference in the flame propagation state in the engine combustion chambers.

Therefore, in the conventional fuel injection control device, although the fuel injection amount is corrected in accordance with the actual fuel injection property of the injectors, there is a limitation to the correction accuracy. In view of correcting the fuel injection amount with sufficiently high reliability also in the minute amount fuel injection such as the pilot injection and the after injection, there is room for improvement.

Patent Document 1: Japanese Laid-Open Patent Publication No. 2003-27995

SUMMARY OF THE INVENTION

Accordingly, it is an objective of the present invention to provide a fuel injection control device for diesel engine that corrects the fuel injection amount with extremely high accuracy, and in particular, that executes, in a suitable manner, fuel injection control that requires precise adjustment of a minute fuel injection amount such as pilot injection and after injection frequently executed in diesel engine.

To achieve the above objective, the present invention provides a fuel injection control device for diesel engine. The device stores a relationship between a required fuel injection amount and a corresponding injection command signal. The device generates the injection command signal corresponding to a required fuel injection amount based on the stored relationship, and drives injectors based on the injection command signal to inject fuel. The device includes a shifting section and a correction section. The shifting section temporarily shifts a fuel injection mode between a first injection mode and a second injection mode to forcibly change the engine rotational speed. The first injection mode is a mode in which an after injection is executed after a main injection. The after injection has less fuel injection amount than the main injection. The second injection mode is a mode in which the after injection is not executed. The correction section detects variation of the engine rotational speed caused by shifting the fuel injection mode, and corrects the stored relationship between the required fuel injection amount and the injection command signal based on comparison between the detected variation of the engine rotational speed and a previously determined standard variation of the engine rotational speed.

DETAILED DESCRIPTION OF THE PREFERRED EMBODIMENTS

A fuel injection control device for diesel engine according to one embodiment of the present invention will now be described with reference to drawings. The fuel injection control device is mounted on a vehicle.

Figure 1:
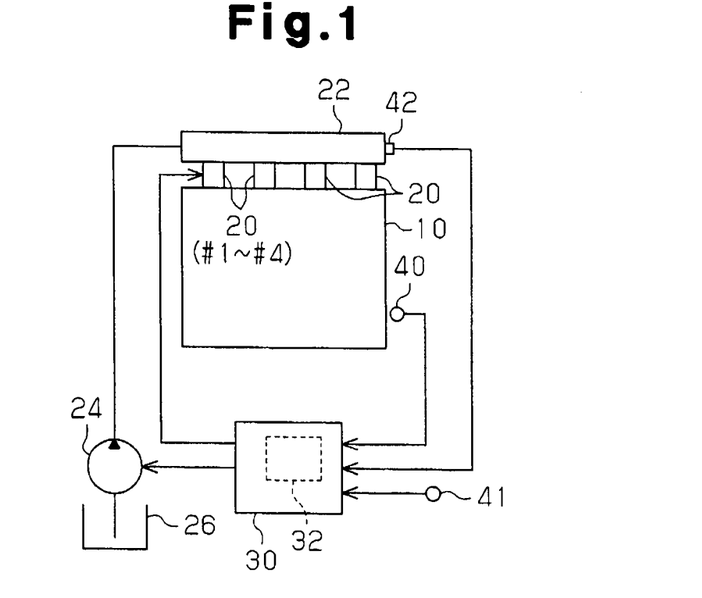
FIG. 1 is a schematic configuration diagram illustrating a diesel engine and a fuel injection control device.

FIG. 1 shows a schematic configuration of a fuel injection control device for diesel engine and a diesel engine 10 to which the device is applied. As shown in FIG. 1, the engine 10 includes four cylinders #1, #2, #3, and #4, and each of the cylinders #1 to #4 is provided with an injector 20. The injectors 20 are connected to a common rail 22, and fuel is supplied from the common rail 22. The common rail 22 is connected to a fuel pump 24, and fuel in a fuel tank 26 is fed to the common rail 22 by the fuel pump 24.

The injectors 20 and the fuel pump 24 are controlled by an electronic control unit 30, which serves as a shifting section and a correcting section. That is, the injectors 20 are opened when being supplied with power through a drive circuit (not shown) of the electronic control unit 30, and inject fuel to the cylinders #1 to #4. Thus, by changing the timing at which power supply is started and the time period during which the injectors 20 are supplied with power, the fuel injection timing of the injectors 20 (the time at which fuel injection is started) and the fuel injection time period are adjusted. Furthermore, the fuel discharge amount of the fuel pump 24 is adjusted through the drive circuit (not shown) of the electronic control unit 30. By adjusting the fuel discharge amount of the fuel pump 24 as described above, the fuel pressure of the common rail 22 (rail pressure), in other words, the fuel injection pressure is adjusted. The fuel injection amount is set based on the fuel injection time period and the fuel injection pressure that are adjusted as described above. Also, the electronic control unit 30 includes a memory 32, which stores the relationship between the required fuel injection amount and the corresponding injection command signal for the injectors 20, that is, the time during which the injectors 20 are supplied with power for each of different fuel injection pressures. Furthermore, on the assumption that the injectors 20 have the standard fuel injection property, and in a case where the fuel injection mode is shifted and the after injection is executed in a learning process described below, the memory 32 stores the relationship between the fuel injection amount of the after injection and the variation of the engine rotational speed caused by executing the after injection for each of three different injection pressure levels.

Furthermore, various types of sensors including a rotational speed sensor 40, which detects the rotational speed of an engine output shaft (not shown), a gas pedal sensor 41, which detects the depression amount of a gas pedal (not shown) (gas pedal depression degree), and a fuel pressure sensor 42, which detects the rail pressure, are connected to the electronic control unit 30. The electronic control unit 30 receives detection values from the sensors. The electronic control unit 30 controls the fuel injection amount and the rail pressure based on the received various types of detection values.

For example, the electronic control unit 30 adjusts the fuel discharge amount of the fuel pump 24 such that the rail pressure becomes equal to a target rail pressure, which is set based on the engine operating state, that is, such that the fuel injection pressure becomes equal to a target injection pressure. Furthermore, the electronic control unit 30 determines the fuel injection amount and the fuel injection mode based on the engine operating state. More specifically, the electronic control unit 30 calculates the engine rotational speed based on the detection value of the rotational speed sensor 40, and determines the fuel injection amount based on the engine rotational speed and the gas pedal depression degree. Furthermore, based on the engine rotational speed and the fuel injection amount, the electronic control unit 30 sets the fuel injection mode to various types of injection modes in which the main injection, the pilot injection, and the after injection are combined as required.

Figure 2:
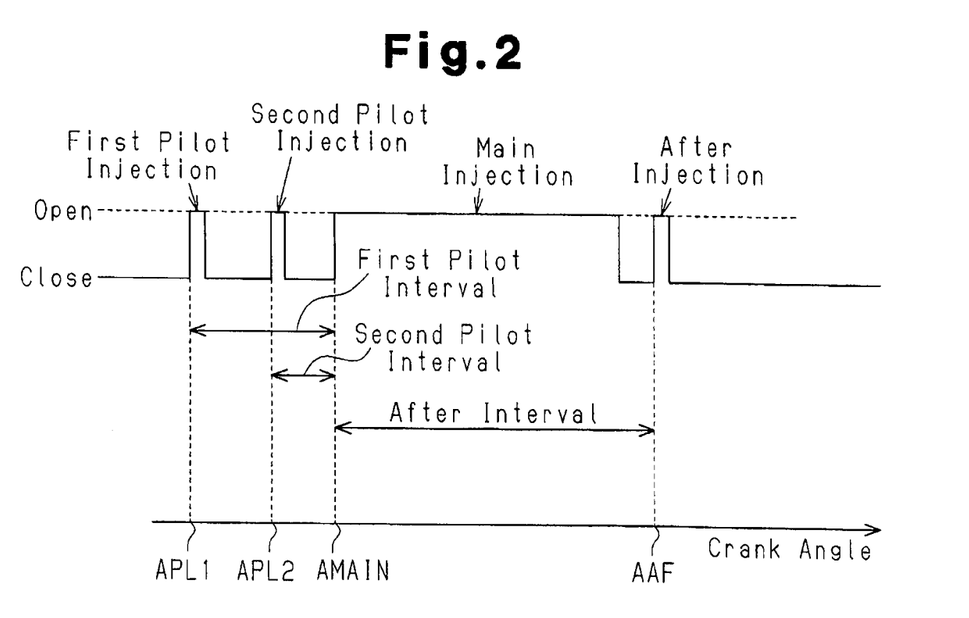
FIG. 2 is a timing chart showing a fuel injection mode.

FIG. 2 shows, as one example of such injection modes, an injection mode in which the pilot injection is executed twice prior to the main injection and the after injection is further executed after the main injection. FIG. 2 shows the opening and closing manner of each injector 20 when such an injection mode is selected. When the pilot injection is executed twice, the pilot injection executed first is referred to as a first pilot injection, and the pilot injection executed for the second time is referred to as a second pilot injection to draw a distinction. As shown in FIG. 2, the fuel injection amount in the first pilot injection, the second pilot injection, and the after injection is set to a very small amount compared to the fuel injection amount in the main injection. When the fuel injection amount of the first pilot injection, the second pilot injection, the main injection, and the after injection are referred to as, in this order, a first pilot injection amount QPL1, a second pilot injection amount QPL2, a main injection amount QMAIN, and an after injection amount QAF, and the fuel injection amount set based on the engine operating state such as the engine rotational speed and the gas pedal depression degree is referred to as a total fuel injection amount QFIN, the main injection amount QMAIN is set based on the following arithmetic expression (1).

$$QMAIN \leftarrow QFIN-(QPL1+QPL2+QAF) \tag{1}$$

That is, when the pilot injections are executed, the pilot injection amounts QPL1, QPL2 at that time are subtracted from the total fuel injection amount QFIN, which is set based on the engine operating state, and when the after injection is executed, the after injection amount QAF at that time is subtracted from the total fuel injection amount QFIN. The difference obtained in this manner in each case is set as the main injection amount QMAIN. Thus, for example, when the after injection is not executed, the difference obtained by subtracting only the pilot injection amounts QPL1, QPL2 from the total fuel injection amount QFIN, which is set based on the engine operating state, is set as the main injection amount QMAIN. Similarly, when the pilot injection is not executed, the difference obtained by subtracting only the after injection amount QAF from the total fuel injection amount QFIN, which is set based on the engine operating state, is set as the main injection amount QMAIN. Furthermore, for example, when the pilot injection and the after injection are not executed, the total fuel injection amount QFIN, which is set based on the engine operating state, is set as the main injection amount QMAIN. When it is previously known that the engine output generated in a batch injection, in which fuel is injected by only the main injection, differs from the engine output generated in a split injection, in which the pilot injection and the after injection are executed, the total fuel injection amount QFIN may be increased by a predetermined amount in the split injection.

In addition, the fuel injection timing of the main injection (main injection timing AMAIN) shown in FIG. 2 is set in the unit of the engine rotational phase, that is, the crank angle based on the engine operating state such as the engine rotational speed and the gas pedal depression degree. The fuel injection timing APL1 of the first pilot injection and the fuel injection timing APL2 of the second pilot injection are set with reference to the main injection timing AMAIN, and are advanced from the main injection timing AMAIN by a first pilot interval and a second pilot interval, respectively. The fuel injection timing of the after injection (after injection timing AAF) is set with reference to the main injection timing AMAIN, and is delayed from the main injection timing AMAIN by an after interval. The first pilot interval, the second pilot interval, and the after interval are set based on the engine operating state such as the engine rotational speed and the gas pedal depression degree in the unit of time.

Since the pilot injection and the after injection are executed as required in addition to the main injection, the engine combustion state is improved, thus reducing the combustion noise and cleaning up the exhaust property. The pilot injection and the after injection require precise adjustment of the minute fuel injection amount. However, since the fuel injection property of the injectors 20 differs in accordance with the initial individual difference, changes over time, or the state of the injection holes at that time, a slight divergence is generated between the fuel injection amount required in the pilot injection and the after injection and the actual fuel injection amount of the injectors 20. Since the pilot injection amount and the after injection amount are very small, influence of such divergence cannot be ignored.

In the fuel injection control device according to the preferred embodiment, when a divergence occurs between the required fuel injection amount and the actual fuel injection amount of the injectors 20 due to a difference between the fuel injection property of the injectors 20 and the standard fuel injection property, the degree of divergence is learned as required. Based on the learned result, the injection command signal of the injectors 20, that is, the relationship between the time during which the injectors 20 are supplied with power and the required fuel injection amount is corrected. More specifically, the after injection is executed in a specific cylinder under a predetermined condition to forcibly change the engine rotational speed. Then, variation of the engine rotational speed detected at that time is compared with the variation corresponding to the predetermined standard fuel injection property to learn the degree of divergence. Hereinafter, the learning process of the fuel injection amount will be described.

Figure 3:
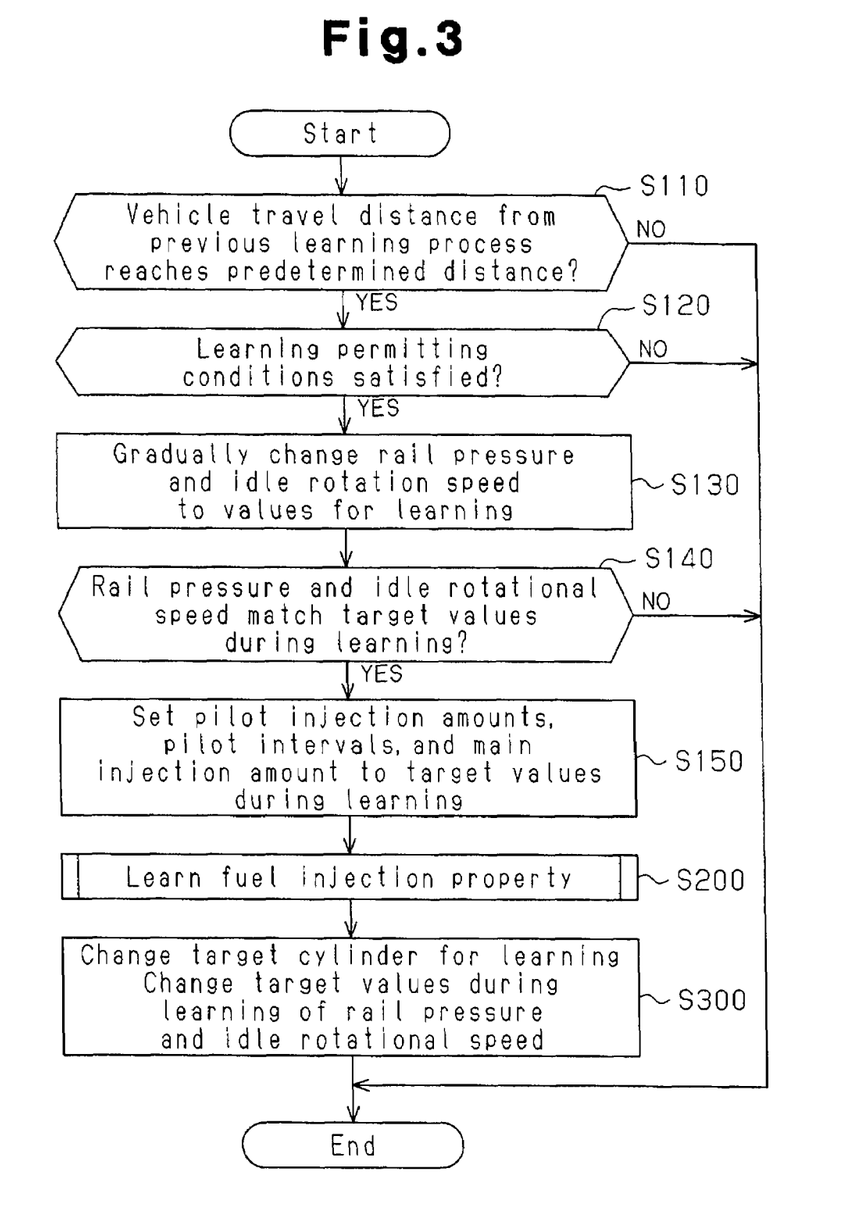
FIG. 3 is a flowchart showing a procedure for learning fuel injection property.
Figure 4:
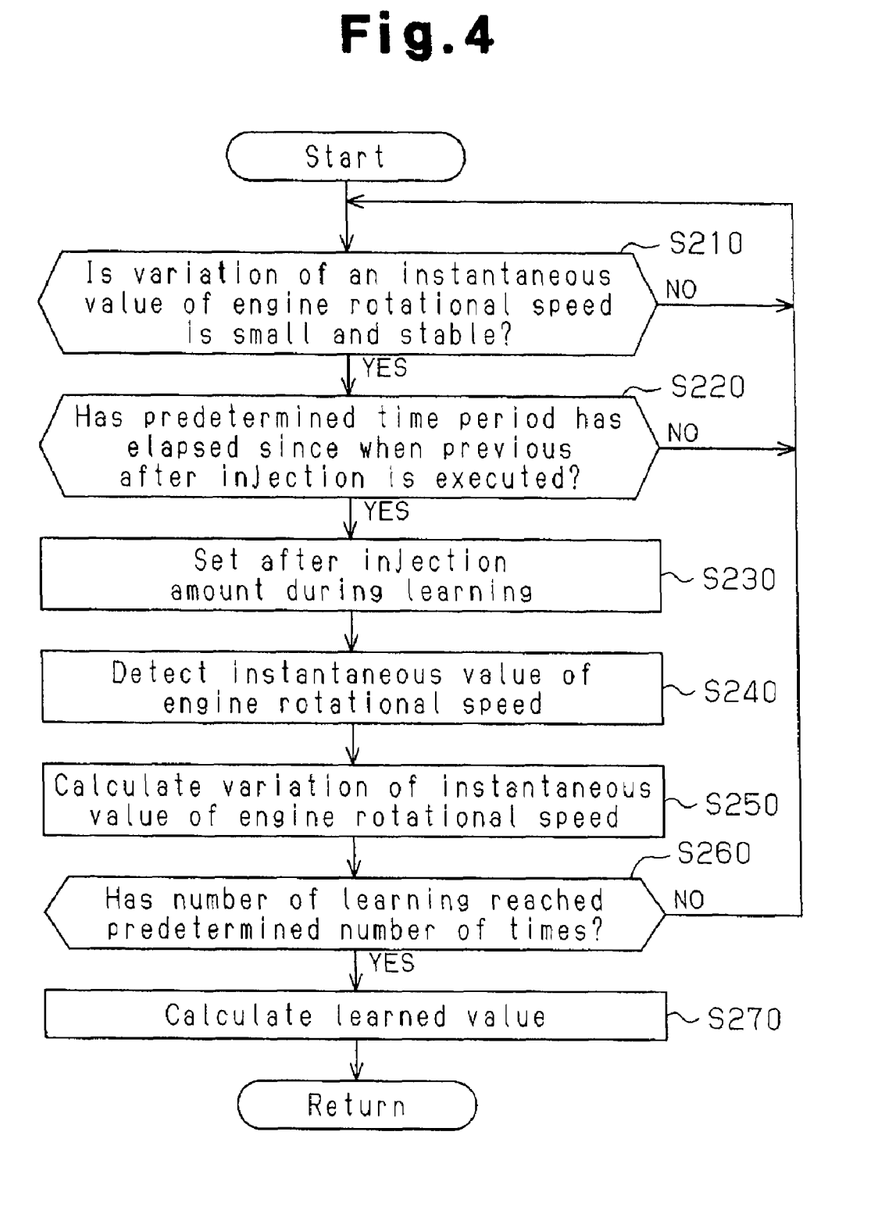
FIG. 4 is also a flowchart showing a procedure for learning fuel injection property.
Figures 5A, 5B, 5C, 5D:
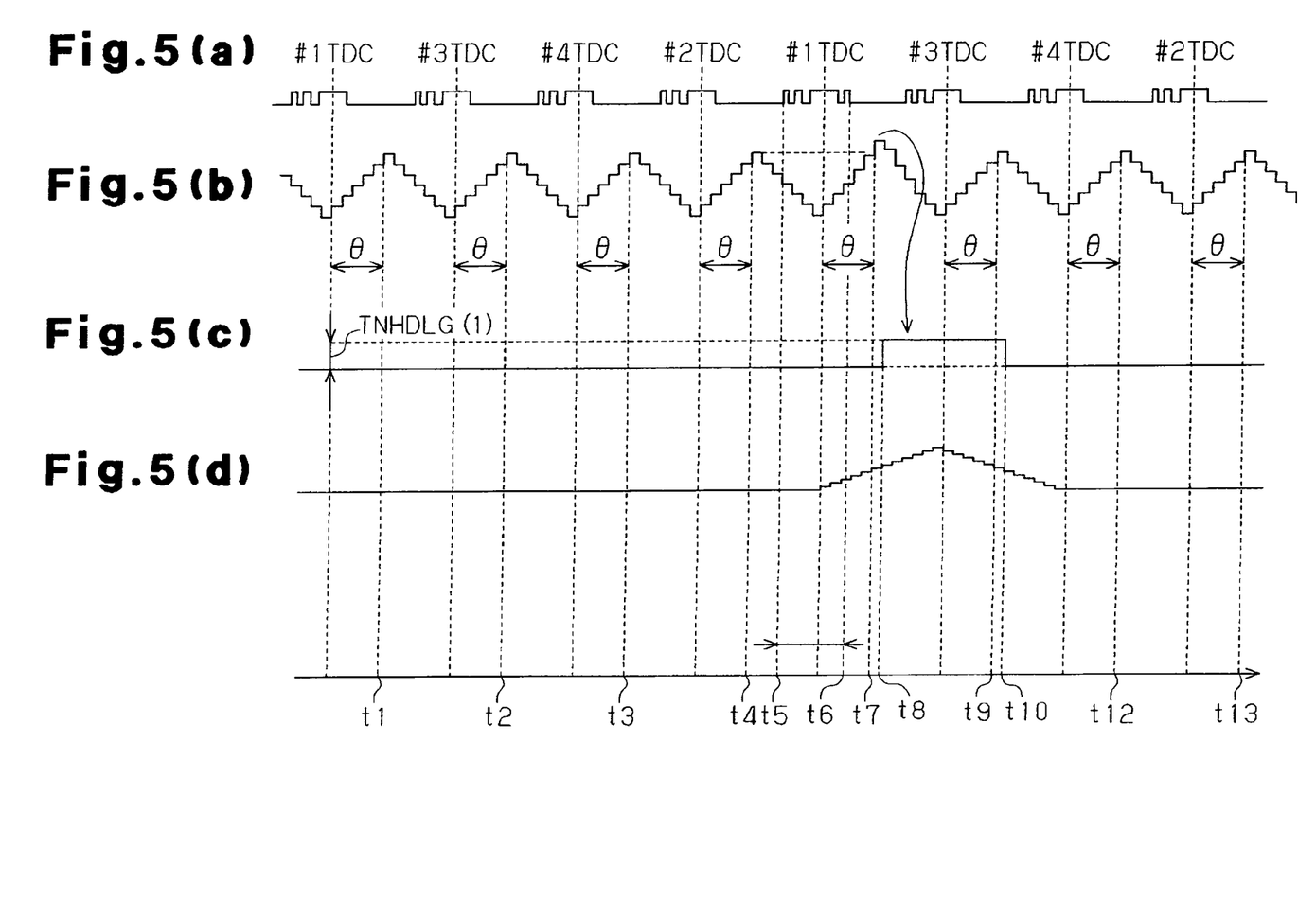
FIG. 5 is a timing chart showing shifting manner of fuel injection mode and changes in engine rotational speed while learning fuel injection property.

FIGS. 3 and 4 are flowcharts showing a routine of the learning process, and FIG. 5 is a timing chart showing the opening and closing state of the injectors 20 (FIG. 5(a)) when the learning process is executed. The electronic control unit 30 repeatedly executes the routine shown in the flowcharts of FIGS. 3 and 4 in a predetermined control cycle.

In a series of processes shown in FIG. 3, first, it is determined whether the vehicle travel distance from when a previous learning process was executed exceeds a predetermined distance (step S110). In the determining process, it is determined that the fuel injection property of the injectors 20 need to be learned when a time period has elapsed during which changes over time in the fuel injection property of the injectors 20 that cannot be ignored are assumed to be caused. When the total operating time of the engine 10 is very short, the friction in driving parts of the engine 10 is very high. In general, such a state is rapidly reduced and becomes steady as the engine 10 is operated. Thus, in this process, by determining whether the vehicle travel distance exceeds the predetermined distance, the learning process is prevented from being performed when the friction is very high, thereby preventing occurrence of erroneous learning. When the vehicle travel distance from when the previous learning process was executed is less than or equal to the predetermined distance, the series of processes are temporarily suspended since the learning process does not need to be performed.

When it is determined that the vehicle travel distance from when the previous learning process was performed exceeds the predetermined distance (step S110: YES), that is, when the fuel injection property of the injectors 20 needs to be learned, it is determined whether learning permitting conditions are satisfied (step S120). In this determining process, when all the following conditions are simultaneously satisfied, the learning permitting conditions are determined to be satisfied.

The engine is in the idle operation.

The idle-up control is not being executed.

The difference between the engine rotational speed and the target idle rotational speed is less than or equal to a predetermined value.

Auxiliary machines such as an air conditioner is stopped and a predetermined time has elapsed from when it is stopped.

A predetermined time has elapsed from when the engine is started.

The engine coolant temperature is greater than or equal to a predetermined temperature.

The fuel temperature is greater than or equal to a predetermined temperature.

The feedback control of the fuel injection amount during engine idle operation is stable.

The oil temperature of an automatic transmission is greater than or equal to a predetermined temperature.

When the learning permitting conditions are not satisfied (step S120: NO), the series of processes are terminated. When it is determined that the learning permitting conditions are satisfied (step S120: YES), the target values of the rail pressure and the engine rotational speed (idle rotational speed) are gradually changed to values for the learning process (target value during learning) (step S130). The target value during learning of the rail pressure is selected as required from pressure values included in a variable range of the rail pressure during normal operation of the engine. Since the rail pressure P is changed within a variable range of "$P1 \leq P \leq P2$", three levels of the pressure values P1, (P1+P2)/2, and P2 included in the variable range are selected as the target values during learning for the rail pressure. As described above, the memory 32 of the electronic control unit 30 stores the relationship between the after injection amount QAF and the variation of the engine rotational speed caused by executing the after injection for several injection pressure levels. More specifically, the pressure values P1, (P1+P2)/2, and P2 correspond to those injection pressure levels.

The target value during learning of the engine rotational speed is set slightly higher than the normal idle target speed to execute the learning under the condition where the engine combustion state is stable. The target value during learning of the engine rotational speed may be set constant regardless of the above mentioned target value during learning of the rail pressure, or may be changed as required in accordance with the target value during learning of the rail pressure. Also, the gradually changing speed when gradually changing the rail pressure and the idle rotational speed is desirably set sufficiently small such that the combustion state will not be rapidly varied and the engine vibration will not be increased due to the change. When the learning permitting conditions are satisfied and the engine is in the idle operating state, only the first pilot injection, the second pilot injection, and the main injection are executed, and the after injection is not executed.

Then, it is determined whether the rail pressure and the engine rotational speed match the corresponding target values during learning (step S140). When the actual value of at least one of the rail pressure and the engine rotational speed has not reached the learning target value (step S140: NO), the series of processes are terminated. If it is determined that the rail pressure and the engine rotational speed match the corresponding target values during learning (step S140: YES), the pilot injection amounts QPL1, QPL2, the pilot intervals, and the main injection amount QMAIN are set to the target values during learning (step S150). Then, a process for detecting the degree of divergence between the actual fuel injection property of the injectors 20 and the standard fuel injection property, that is, learning of a substantial fuel injection property is executed (step S200). Then, after learning of a certain cylinder is finished, a target cylinder for learning is changed and learning is executed again (step S300). When learning of the fuel injection property of all the cylinders #1 to #4 is completed, the rail pressure and the engine rotational speed are subsequently changed (step S300), and learning of the cylinders #1 to #4 is sequentially executed in the same manner.

The detailed routine for learning the fuel injection property (step S200 of FIG. 3) will now be described with reference to the flowchart of FIG. 4.

In the series of processes, first, it is determined whether the variation of an instantaneous value of the engine rotational speed is small and stable (step S210). More specifically, it is determined whether the following conditional expressions (2) and (3) are both satisfied.

$$\Sigma |TNHDL(i)| \leq \alpha \quad (2)$$

$$|TNHDL(i)| \leq \beta \quad (3)$$

α, β: predetermined values $$TNHDL(i) \leftarrow TNH(i) - TNHO(i) \quad (4)$$

i=1, 2, 3, 4

Wherein "TNH(i)" in the above expression (4) is, as shown in the timing chart of FIG. 5, the instantaneous value of the engine rotational speed detected at the engine rotational phase delayed from the compression top dead center TDC of the cylinders #1 to #4 by a predetermined rotational phase θ. "(i): i=1, 2, 3, 4" are identifiers corresponding to the cylinders #1 to #4. "TNH(i)" represents the current instantaneous value of the engine rotational speed, and "TNHO(i)" represents the previous instantaneous value of the engine rotational speed. For example, at time t1 and time t7 shown in FIG. 5, the instantaneous value of the engine rotational speed for the first cylinder #1 is detected, and at time t4 and time t13, the instantaneous value of the engine rotational speed for the second cylinder 2 is detected. Similarly, at time t2 and time t9 in FIG. 5, the instantaneous value of the engine rotational speed for the third cylinder #3 is detected, and at time t3 and time t12, the instantaneous value of the engine rotational speed for the fourth cylinder 4 is detected.

The engine rotational speed (specifically, the rotational speed of the engine output shaft) fluctuates in synchronization with the engine combustion in the cylinders #1 to #4. However, since the fluctuation amount is extremely small, the engine rotational speed is generally filtered to be used as a value for indicating the engine operating state, that is, a general engine control parameter, which is the engine rotational speed. In this case, even if the engine rotational speed actually fluctuates by the engine combustion that intermittently occurs, if the fluctuation amount among the cylinders #1 to #4 is equal, the fluctuation is ignored through the filtering process, and the engine rotational speed is assumed to be constant.

In this learning process, as described above, it is necessary to detect extremely minute change in the engine rotational speed caused by adding the after injection. Therefore, in the learning process, the concept of the instantaneous value of the engine rotational speed as described above is introduced to properly detect the minute change. In FIG. 5, (b) indicates the instantaneous value of the engine rotational speed, and (d) indicates the engine rotational speed obtained by filtering the instantaneous value of the engine rotational speed. In the preferred embodiment, the instantaneous value of the engine rotational speed detected at the engine rotational phase delayed from the compression top dead center TDC of each of the cylinders #1 to #4 by a predetermined rotational phase θ is particularly referred to as the instantaneous value of the engine rotational speed TNH(i). The predetermined rotational phase θ is previously determined through experiments such that the engine rotational speed becomes temporarily the highest by the engine combustion in each of the cylinders #1 to #4 at the engine rotational phase delayed from the compression top dead center by the predetermined rotational phase θ. Furthermore, the predetermined rotational phase θ is set to be included in an engine rotational phase range from when the fuel injection of a certain cylinder is completed until the fuel injection of a next cylinder is started.

"TNHDL(i)" in the above expression (4) is the deviation between the current instantaneous value of the engine rotational speed TNH(i) for the ith cylinder and the previous instantaneous value of the engine rotational speed TNHO(i) for the ith cylinder. Thus, "Σ|TNHDL(i)|" on left-hand side of the conditional expression (2) is the sum total of the absolute values of the deviation "TNH(i)−TNHO(i)" obtained for the latest four cylinders among the cylinders #1 to #4. The sum total Σ|TNHDL(i)| is an index representing the stability of the engine rotational speed. If this value is great, for example, it is determined that the engine rotational speed is currently in a state where it is easily fluctuated. Furthermore, the conditional expression (3) is satisfied when the absolute values of the deviations |TNHDL(1)|, |TNHDL(2)|, |TNHDL(3)|, and |TNHDL(4)| are all less than or equal to the predetermined value β. Thus, when these conditional expressions (2), (3) are satisfied, the combustion and explosive power generated in each of the cylinders #1 to #4 is stable, and there is no big difference in the combustion and explosive power of the cylinders #1 to #4. In other words, it is determined that the engine is in a steady-state operation in which the fluctuation amount of the engine rotational speed is less than or equal to a predetermined amount for a predetermined time period.

In the determining process of step S210, if it is determined that the instantaneous variation of the engine rotational speed is great or unstable (step S210: NO), the process is repeated. Then, if the variation of the instantaneous value of the engine rotational speed is small and stable, and it is determined that the engine is in the steady-state operation (step S210: YES), subsequently, it is determined whether a predetermined time period has elapsed since when the previous after injection is executed (step S220). If it is determined that the predetermined time period has not elapsed (step S220: NO), the process returns to step S210. As described above, in this learning process, the fuel injection mode is temporarily shifted from the injection mode in which the after injection is not executed to the injection mode in which the after injection is executed. In the determining process, the fuel injection mode is not shifted until a predetermined time period elapses from when the fuel injection mode is shifted as described above and the after injection is executed. The length of the predetermined time period is set such that after the after injection is executed once in a specific cylinder by shifting the fuel injection mode, the fuel injection mode is restored to the injection mode in which the after injection is not executed.

In the determining process, if it is determined that a predetermined time period has elapsed from when the previous after injection is executed (step S220: YES), the after injection amount QAF is subsequently set (step S230). In the normal engine operation state, the after injection amount QAF is set based on the arithmetic expression (1). However, in this learning process, the after injection amount QAF is calculated separately from the total fuel injection amount QFIN, which is set based on the engine operating state. That is, when the fuel injection mode is shifted in the learning process, the total fuel injection amount is increased by the amount corresponding to the after injection amount QAF. Thus, although the fuel injection mode is shifted, the pilot injection amounts QPL1, QPL2 and the main injection amount QMAIN are not reduced, and are maintained to the amounts of a time before shifting the fuel injection mode. Also, unlike the after injection amount QAF in the normal operation state, the after injection amount QAF in the learning process is set to an amount irrelevant to the engine operating state. More specifically, to minimize increase in the engine output caused by executing the after injection, the after injection amount QAF is set to the minimum amount that can be injected from the injector 20 or an amount close to the minimum amount.

When the after injection amount QAF is set in this manner, the fuel injection mode is shifted to the injection mode in which the after injection is executed (time t5 to time t6 in FIG. 5). Then, the instantaneous value of the engine rotational speed TNH(i) is detected (step S240). FIG. 5(c) shows changes in the instantaneous value of the engine rotational speed TNH(i). As shown in FIG. 5(c), when the after injection is executed after the fuel injection mode is shifted, the instantaneous value of the engine rotational speed TNH temporarily increases accordingly (time t8 to time t10). FIG. 5 shows an example of when the first cylinder #1 is selected as the current learning target cylinder.

Subsequently, the deviation (=TNH(i)–TNHO(i)) between the instantaneous value of the engine rotational speed TNHO(i) of the ith cylinder detected immediately before the fuel injection mode is shifted and the instantaneous value of the engine rotational speed TNH(i) of the ith cylinder detected immediately after the fuel injection mode is shifted is calculated as the variation TNHDLG(i) of the instantaneous value of the engine rotational speed TNH(i) (step S250). The variation TNHDLG(i) is calculated based on the instantaneous value of the engine rotational speed TNH(i) obtained for the same cylinder. However, the variation TNHDLG(i) may be obtained based on the instantaneous value of the engine rotational speed TNH(i) obtained for different cylinders. In this case, it is desirable that the deviation between the instantaneous value of the engine rotational speed TNH(i) for the learning target cylinder and the instantaneous value of the engine rotational speed TNH(j) for the cylinder that is in the combustion and explosion stroke immediately before the learning target cylinder be set as the variation TNHDLG(i).

Subsequently, it is determined whether the number of learning of the specific cylinder has reached a predetermined number of times n (step S260). If it is determined that the number of learning is less than the predetermined number of times n (step S260: NO), the processes after step S210 are executed again. If the number of learning has reached the predetermined number of times n (step S260: YES), the learned value TNHDLGF(i) representing the degree of divergence of the fuel injection property is calculated based on the previously calculated variation TNHDLG(i) of the instantaneous value of the engine rotational speed TNH(i) (step S270). In this process, first, pieces of data that have the minimum value and the maximum value are excluded from a population pieces of data associated with the variation TNHDLG(i), the number of which is n. That is, in this embodiment, pieces of data that indicate values significantly different from other values due to incidental factors such as noise are excluded from the population to increase the reliability of the data. Subsequently, the mean of the remaining pieces of data, the number of which is (n−2) is obtained, and the mean is used as the learned value TNHDLGF(i). After calculating the learned value TNHDLGF(i), the processes after step S300 shown in FIG. 3 are executed again.

The learned value TNHDLGF(i) obtained as described above is an increase amount of the instantaneous value of the engine rotational speed TNH(i) caused by executing the after injection. Thus, the learned value TNHDLGF(i) is increased as the fuel injection amount of the after injection is increased. As described above, the memory 32 of the electronic control unit 30 stores the relationship between the after injection amount QAF and the variation of the engine rotational speed when the after injection is executed, that is, the learned value TNHDLGF(i).

Figure 6:
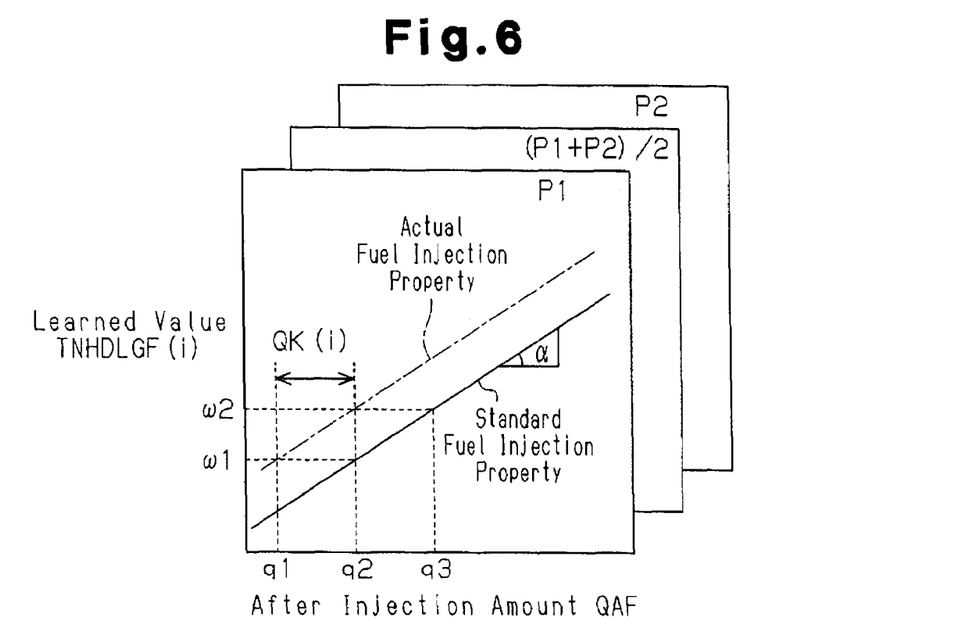
FIG. 6 is a map showing relationship between a learned value and an after injection amount.

FIG. 6 is a graph showing the relationship between the after injection amount QAF and the learned value TNHDLGF(i).

As shown in FIG. 6, as the after injection amount QAF is increased, the learned value TNHDLGF(i) is linearly increased. On the assumption that the injectors 20 have the standard fuel injection property, if the value of the after injection amount QAF is "q2", the value of the learned value TNHDLGF(i) is "ω1" as shown in FIG. 6. However, for example, if the injectors 20 tend to inject greater fuel than the injectors 20 having the standard fuel injection property, the value of the learned value TNHDLGF(i) will be "ω2", which is greater than "ω1". That is, in this case, the value of the actual after injection amount QAF of the injectors 20 is not "q2", but is "q3" corresponding to a case where the value of the learned value TNHDLGF(i) is "ω2". Thus, to set the fuel injection amount of the injectors 20 to "q2", the value of the after injection amount QAF is set to "q1" corresponding to a case where the value of the learned value TNHDLGF(i) is "ω1", and the corresponding injection command signal is sent to the injectors 20. In this manner, the fuel injection amount is corrected based on the learned value TNHDLGF(i) obtained through the above mentioned series of processes and the storage of the memory 32.

Figure 7:
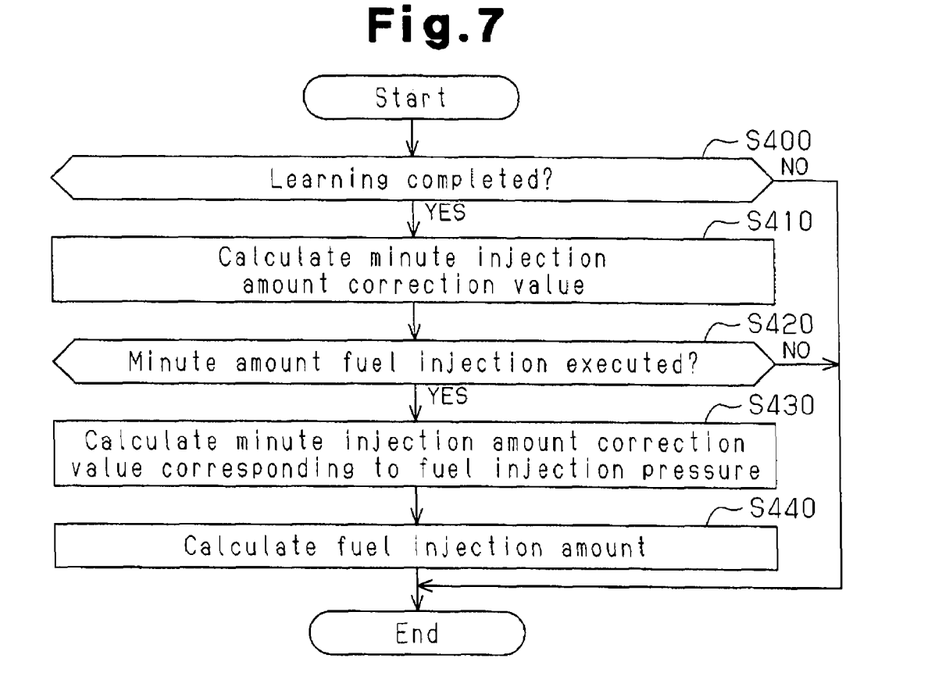
FIG. 7 is a flowchart showing a procedure for learning fuel injection property.

The procedure for correcting the fuel injection amount will be described in detail with reference to the flowchart of FIG. 7. The series of processes of this flowchart are repeated by the electronic control unit 30 in a predetermined control cycle.

In the series of processes, first, it is determined whether the learning is completed (step S400). That is, it is determined whether the learning of all the injection pressure levels for the cylinders #1 to #4 is completed. If the learning is not completed (step S400: NO), the series of processes are temporarily suspended. If it is determined that the learning is completed (step S400: YES), based on the following arithmetic expression (5), a minute injection amount correction value QK(i) corresponding to the cylinders #1 to #4 is calculated for every injection pressure level.

$$QK(i) \leftarrow (\omega 2 - \omega 1)/a \quad (5)$$

In the expression (5), "a" represents the gradient of the solid line shown in FIG. 6, and refers to the ratio of the variation of the learned value TNHDLGF(i) to the variation of the after injection amount QAF (=Δ(learned value TNHDLGF(i))/ΔQAF) when the injectors 20 have the standard fuel injection property.

After calculating the minute injection amount correction value QK(i) of the cylinders #1 to #4 corresponding to each injection pressure level, it is determined whether the fuel injection mode set based on the engine operating state is in the mode in which the minute amount fuel injection such as the pilot injection and the after injection is executed (step S420). If fuel cutoff or batch injection is executed, and the minute amount fuel injection is not executed (step S420: NO), the series of processes are temporarily suspended. If the minute amount fuel injection is executed (step S420: YES), the minute injection amount correction value QK(i) corresponding to the current fuel injection pressure is calculated by interpolation using the previously calculated minute injection amount correction value QK(i) of each injection pressure level (step S430). Then, based on the following arithmetic expressions (6) to (8), the fuel injection amount in the minute amount fuel injection, that is, the pilot injection amounts QPL1, QPL2 and the after injection amount QAF are calculated (step S440).

$$QPL1F \leftarrow QPL1 - QK(i) \quad (6)$$

$$QPL2F \leftarrow QPL2 - QK(i) \quad (7)$$

$$QAFF \leftarrow QAF - QK(i) \quad (8)$$

Wherein "QPL1F", "QPL2F", and "QAFF" are final values obtained by correcting the first pilot injection amount QPL1, the second pilot injection amount QPL2, and the after injection amount QAF using the minute injection amount correction value QK(i). For example, in a case where the engine output slightly differs due to the difference in the fuel injection mode, the right-hand sides of the expressions (6) to (8) are desirably corrected using a coefficient for compensating for the difference. Furthermore, for example, by multiplying the right-hand sides of the expressions (6) to (8) by a predetermined coefficient K ($\leq 1.0$), the degree of correction of the injection amount based on the minute injection amount correction value QK(i) can be adjusted. That is, the constant K is normally set to 1.0, and is changed to a value less than 1.0 that is normally set when, for example, the correction degree needs to be temporarily reduced for various circumstances such as when there is a possibility of erroneous learning.

After calculating the final values QPL1F, QPL2F, QAFF of each fuel injection amount in the minute amount fuel injection, the injection command signals for the injectors 20 in the cylinders #1 to #4 are generated based on the calculated final values. The correction of the fuel injection amount based on the minute injection amount correction value QK(i) is not for correcting the fuel injection amount itself, but for correcting the relationship between the required fuel injection amount and the injection command signal for the injectors 20 that do not have the standard fuel injection property. Since the correction based on the minute injection amount correction value QK(i) is performed, the minute amount fuel injection is executed in the cylinders #1 to #4 with appropriate amount of fuel corresponding to the engine operating state.

The fuel injection control device according to the preferred embodiment has the following advantages.

Even if divergence occurs between the required fuel injection amount and the actual fuel injection amount in the fuel injection property of the injectors 20 due to unintentional changes such as changes over time, the divergence is reduced by correcting the relationship between the required fuel injection amount and the injection command signal. Thus, the fuel injection control is executed in a suitable manner in which precise adjustment of the minute fuel injection amount is required such as the pilot injection and the after injection executed frequently in diesel engines. Furthermore, since the after injection is performed during diffusion combustion that occurs subsequent to the premix combustion, influence to the engine combustion state is relatively small as compared to the pilot injection. Thus, correcting the relationship between the required fuel injection amount and the injection command signal minimizes the influence to the engine combustion state.

Also, the pilot injection amounts QPL1, QPL2 and the main injection amount QMAIN before shifting the fuel injection mode are set equal to those after shifting the fuel injection mode, so that the total fuel injection amount is increased by the amount corresponding to the after injection when the fuel injection mode is shifted. Thus, the correlation between the learned value TNHDLGF(i) and the after injection amount QAF is significantly increased, and the relationship between the required fuel injection amount and the injection command signal is further accurately corrected.

Since the fuel injection mode is shifted under the condition that the change of the instantaneous value of the engine rotational speed is small and stable, the variation of the instantaneous value of the engine rotational speed caused by shifting the fuel injection mode and executing the after injection is accurately detected. Thus, the relationship between the required fuel injection amount and the injection command signal is further accurately corrected.

After the fuel injection mode is shifted and the after injection is executed once, the fuel injection mode is promptly restored to the state of a time before shifting the fuel injection mode. Thus, the time period from when the fuel injection mode is shifted to when the fuel injection mode is restored to the mode prior to the shifting is significantly shortened. This suppresses the engine rotational speed from increasing by a large amount due to the execution of the learning process associated with the fuel injection amount property. Furthermore, compared to a case where the fuel injection mode is shifted and the after injection is executed more than once, the correlation between the after injection amount and variation of the instantaneous value of the engine rotational speed is increased.

Furthermore, when detecting the change in the engine rotational speed caused by executing the after injection, the instantaneous value of the engine rotational speed detected at the engine rotational phase delayed from the compression top dead center by the predetermined rotational phase θ is used. The detection timing of the engine rotational speed is set within the time period from when the fuel injection in the learning target cylinder is completed until the fuel injection in the next cylinder is started. Thus, while minimizing the influence caused by fluctuation of the engine rotational speed associated with the combustion in the cylinders in which combustion is performed before and after the specific cylinder, the change in the engine rotational speed caused by shifting the fuel injection mode of the specific cylinder is accurately detected. As a result, the relationship between the required fuel injection amount and the injection command signal is very accurately corrected.

Also, in a case where the fuel injection mode is temporarily shifted, the associated change in the engine rotational speed is slightly delayed from the shifting timing of the fuel injection mode regardless of whether the engine rotational speed is increased or decreased. In this regard, in the preferred embodiment, since the instantaneous value of the engine rotational speed at the engine rotational phase delayed from the compression top dead center by the predetermined rotational phase θ is detected, the relationship between the required fuel injection amount and the injection command signal is further accurately corrected.

In addition, the variation TNHDLG(i) of the instantaneous value of the engine rotational speed TNH(i) is calculated based on the instantaneous value of the engine rotational speed TNH(i) obtained for the same cylinder. Thus, for example, compared to a case where the instantaneous value of the variation TNHDLG(i) of the engine rotational speed TNH(i) is calculated based on the instantaneous value of the engine rotational speed TNH(i) obtained for different cylinders, the fuel injection property of the injectors 20 corresponding to the cylinders #1 to #4 is accurately obtained, and the relationship between the required fuel injection amount and the injection command signal is further accurately corrected to match the fuel injection property.

Furthermore, when the fuel injection amount property is learned, the engine rotational speed is temporarily increased by shifting the fuel injection mode from the injection mode in which the after injection is not executed to the injection mode in which the after injection is executed. Thus, execution of the above learning process suppresses occurrence of adverse effect such as destabilization of the engine combustion state such as misfires and engine stall.

The preferred embodiment may be modified as follows.

In the preferred embodiment, when detecting the minute fluctuation amount of the engine rotational speed caused by adding the after injection, the fluctuation amount is calculated based on the engine rotational speed (that is, the instantaneous value of the engine rotational speed) at the timing delayed from the compression top dead center by the predetermined rotational phase θ. However, instead of fixing the engine rotational phase at which the engine rotational speed is detected, for example, the fluctuation amount may be calculated based on the local extremum of the engine rotational speed (local maximum in this case) caused after completing the after injection.

Furthermore, the minute fluctuation amount of the engine rotational speed caused by adding the after injection may be calculated based on the engine rotational speed generally used in the engine control (FIG. 5(d)). In this case, the local maximum of the engine rotational speed caused after completing the after injection is desirably detected. Beside this, the fluctuation amount may be calculated based on, for example, the integral and the mean of the engine rotational speed detected before a predetermined time period elapses from the compression top dead center.

In the preferred embodiment, when the fuel injection property is learned, the after injection is executed by n times. For example, when the variation TNHDLG(i) of the instantaneous value of the engine rotational speed TNH(i) is great, that is, when the control accuracy of the fuel injection amount is low and the fluctuation of the engine output is great during the minute amount fuel injection, it is desirable to temporarily reduce the number of times by which the after injection is executed to obtain the learned value TNHDLGF(i) at an early stage, and promptly reflect it in the minute amount fuel injection. Then, after increasing the control accuracy of the fuel injection amount during the minute amount fuel injection to a certain degree, the number of times by which the after injection is executed during learning is increased. In this case, the number of execution times is desirably set such that as the variation TNHDLG(i) is increased, the number of times n by which the after injection is executed is reduced.

The learning of the fuel injection property may be executed not only during engine idle operation, but also when, for example, the variation of the engine rotational speed is extremely small and stable such as when the vehicle is traveling in steady state.

In the preferred embodiment, learning of the fuel injection property is executed by shifting the fuel injection mode from the injection mode in which the after injection is not executed to the injection mode in which the after injection is executed. However, according to the similar procedure, learning of the fuel injection property may be executed by shifting the fuel injection mode from the injection mode in which the after injection is executed to the injection mode in which the after injection is not executed.

In the preferred embodiment, the after injection is additionally executed in the state where the first pilot injection and the second pilot injection are executed beside the main injection. However, for example, the after injection may be additionally executed in a state where only the first pilot injection is executed beside the main injection, or the after injection may be additionally executed in a state where only the main injection is executed.

In the preferred embodiment, learning of the fuel injection amount property is executed every time the vehicle travel distance reaches the predetermined distance. However, the timing at which the learning is executed is not restricted to that described in the preferred embodiment but may be changed as required. For example, the learning may be executed every time the fuel injection amount reaches a predetermined amount.

The friction state of the engine 10 is estimated based on, for example, the vehicle travel distance. The minute injection amount correction value QK(i) is reflected in the correction of the fuel injection amount based on the estimation. At this time, the reflection degree may be changed. Similarly, the reflection degree may also be changed based on the intake temperature and the atmospheric pressure.

During the engine idle operation, the total fuel injection amount QFIN is basically calculated based on functions that uses the engine rotational speed and the gas pedal depression degree as parameters, that is, an idle governor pattern. During engine idle operation, as the engine rotational speed is decreased, the total fuel injection amount QFIN is increased so as to suppress engine from stalling. However, since the engine rotational speed is temporarily forcibly changed in the above mentioned learning process, when the total fuel injection amount QFIN is changed in accordance with the engine rotational speed, unnecessary fluctuation of the engine rotational speed might occur, which undesirably reduces the learning frequency. Therefore, when executing the learning process, by using an idle governor pattern that differs from the normal state, more specifically, a pattern in which the variation of the total fuel injection amount QFIN with respect to the variation of the engine rotational speed is small or in which the total fuel injection amount QFIN does not change at all, such fluctuation of the engine rotational speed is suppressed, thereby suppressing the learning frequency from being reduced.

In the preferred embodiment, the fuel injection amount is corrected using the minute injection amount correction value QK(i) only when the minute amount fuel injection such as the pilot injection and the after injection is executed. However, the main injection amount may be corrected in the same manner.

In the preferred embodiment, the after injection is executed only once in the learning process. However, the after injection may be executed more than once. In this case also, variation of the instantaneous value of the engine rotational speed caused by the first after injection is desirably detected.

The invention claimed is:

1. A fuel injection control device for diesel engine, wherein the device stores a relationship between a required fuel injection amount and a corresponding injection command signal, the device generates the injection command signal corresponding to the required fuel injection amount based on the stored relationship, and drives injectors based on the injection command signal to inject fuel, the device comprising:

a shifting section, which temporarily shifts a fuel injection mode between a first injection mode and a second injection mode to forcibly change the engine rotational speed, the first injection mode being a mode in which an after injection is executed after a main injection, the after injection having less fuel injection amount than the main injection, and the second injection mode being a mode in which the after injection is not executed; and a correction section, which detects variation of the engine rotational speed caused by shifting the fuel injection mode, and corrects the stored relationship between the required fuel injection amount and the injection command signal based on comparison between the detected variation of the engine rotational speed and a previously determined standard variation of the engine rotational speed.

2. The device according to claim 1, wherein the fuel injection amount of the main injection in the first injection mode is equal to the fuel injection amount of the main injection in the second injection mode.

3. The device according to claim 2, wherein, when the fuel injection mode is in one of the first and second injection modes, the shifting section detects the fluctuation amount of the engine rotational speed associated with a predetermined number of cylinders of the engine as an amount corresponding to explosion of fuel, and shifts the fuel injection mode when the engine is in a steady-state operation, in which a state where the absolute values of the detected fluctuation amounts and the sum total of the absolute values are less than or equal to a predetermined amount, continues for a predetermined time period.

4. The device according to claim 2,
wherein the relationship between the required fuel injection amount and the injection command signal is stored for a plurality of different fuel injection pressure levels,
wherein the shifting section shifts the fuel injection mode under each of the different fuel injection pressure levels, and
wherein the correction section detects the variation of the engine rotational speed in each of the fuel injection pressure levels, and wherein, based on the detected result, the correction section corrects the relationship in the corresponding fuel injection pressure level.

5. The device according to claim 2, wherein, after shifting the fuel injection mode and executing the fuel injection once in a specific cylinder, the shifting section restores the fuel injection mode to the mode prior to the shifting.

6. The device according to claim 1, wherein, when the fuel injection mode is in one of the first and second injection modes, the shifting section detects the fluctuation amount of the engine rotational speed associated with a predetermined number of cylinders of the engine as an amount corresponding to explosion of fuel, and shifts the fuel injection mode when the engine is in a steady-state operation, in which a state where the absolute values of the detected fluctuation amounts and the sum total of the absolute values are less than or equal to a predetermined amount, continues for a predetermined time period.

7. The device according to claim 6,
wherein the relationship between the required fuel injection amount and the injection command signal is stored for a plurality of different fuel injection pressure levels,
wherein the shifting section shifts the fuel injection mode under each of the different fuel injection pressure levels, and
wherein the correction section detects the variation of the engine rotational speed in each of the fuel injection pressure levels, and wherein, based on the detected result, the correction section corrects the relationship in the corresponding fuel injection pressure level.

8. The device according to claim 6, wherein, after shifting the fuel injection mode and executing the fuel injection once in a specific cylinder, the shifting section restores the fuel injection mode to the mode prior to the shifting.

9. The device according to claim 1,
wherein the relationship between the required fuel injection amount and the injection command signal is stored for a plurality of different fuel injection pressure levels,
wherein the shifting section shifts the fuel injection mode under each of the different fuel injection pressure levels, and
wherein the correction section detects the variation of the engine rotational speed in each of the fuel injection pressure levels, and wherein, based on the detected result, the correction section corrects the relationship in the corresponding fuel injection pressure level.

10. The device according to claim 9, wherein, after shifting the fuel injection mode and executing the fuel injection once in a specific cylinder, the shifting section restores the fuel injection mode to the mode prior to the shifting.

11. The device according to claim 1, wherein, after shifting the fuel injection mode and executing the fuel injection once in a specific cylinder, the shifting section restores the fuel injection mode to the mode prior to the shifting.

12. The device according to claim 11, wherein the correction section detects the variation of the engine rotational speed based on the engine rotational speed in a predetermined monitoring period after fuel injection in the specific cylinder is completed.

13. The device according to claim 12, wherein the predetermined monitoring period is a period from when the fuel injection is completed in the specific cylinder until the fuel injection in a next cylinder is started.

14. The device according to claim 13, wherein the correction section detects variation of the engine rotational speed based on the engine rotational speed at a previously determined engine rotational phase included in the predetermined monitoring period.

15. The device according to claim 13, wherein the correction section detects the variation of the engine rotational speed based on a local extremum of the engine rotational speed in the predetermined monitoring period.

16. The device according to claim 12, wherein the correction section detects variation of the engine rotational speed based on the engine rotational speed at a previously determined engine rotational phase included in the predetermined monitoring period.

17. The device according to claim 12, wherein the correction section detects the variation of the engine rotational speed based on a local extremum of the engine rotational speed in the predetermined monitoring period.

18. The device according to claim 12, wherein the correction section detects the deviation between engine rotational speeds NE1, NE2 as a variation of the engine rotational speed caused by shifting the fuel injection mode, the rotational speed NE1 being an engine rotational speed detected in a time period from when fuel injection is completed in the specific cylinder until the predetermined monitoring period elapses in a case where the fuel injection mode is temporarily shifted and fuel injection is executed in the specific cylinder, and the rotational speed NE2 being an engine rotational speed detected in a time period from when fuel injection is completed in the specific cylinder until the predetermined monitoring period elapses in a case where the fuel injection mode is maintained and fuel injection is executed in the specific cylinder.

19. The device according to claim 18, wherein the correction section detects the engine rotational speed NE2 immediately before the fuel injection mode is shifted.

20. The device according to claim 1, wherein the shifting section shifts the fuel injection mode from the second injection mode to the first injection mode.

* * * * *